UNITED STATES PATENT OFFICE

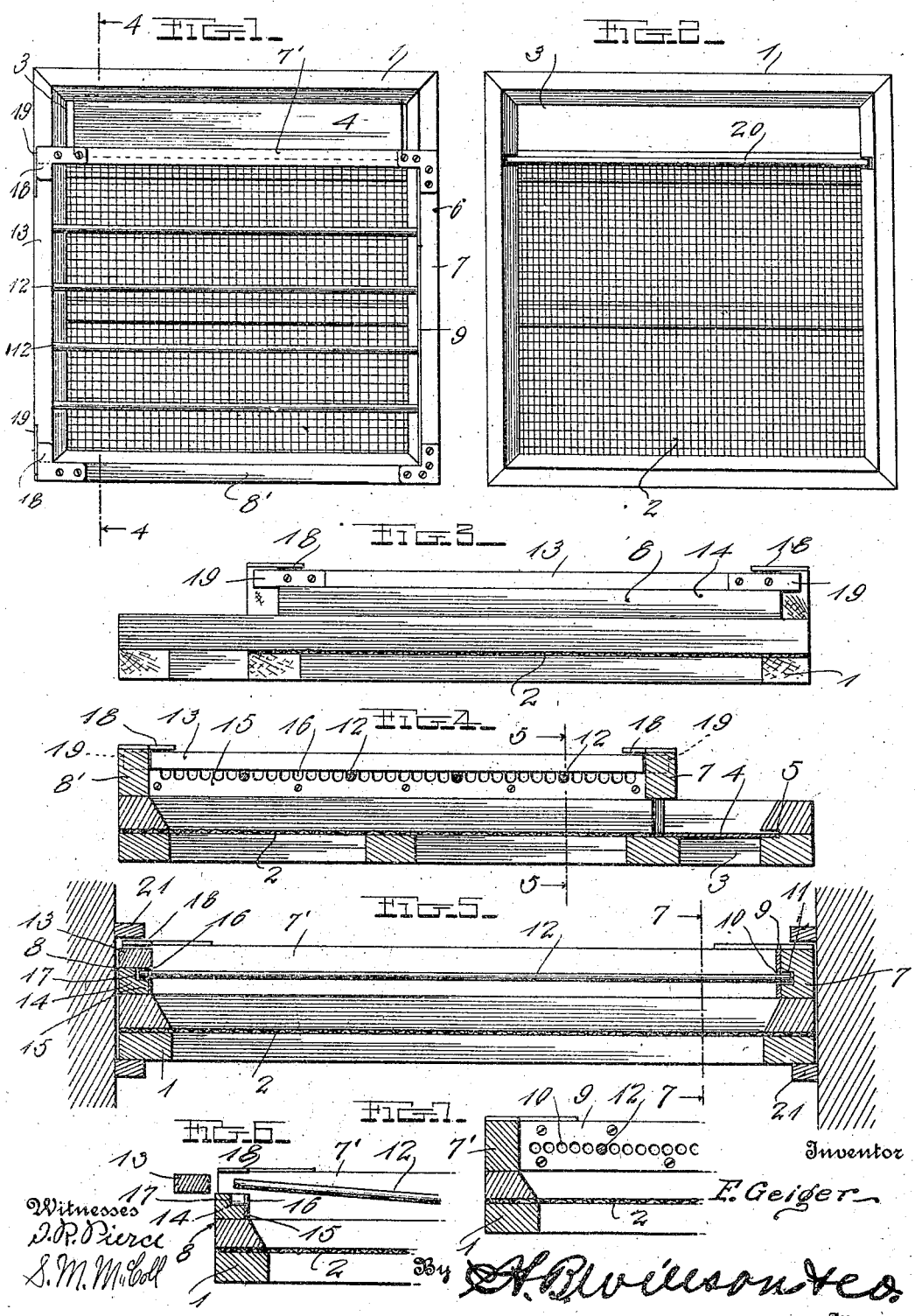

FRANK GEIGER, OF EVEREST, KANSAS, ASSIGNOR TO OUR MANUFACTURING COMPANY.

EGG-TRAY FOR INCUBATORS.

1,081,903.

Specification of Letters Patent.   Patented Dec. 16, 1913.

Application filed October 3, 1912.   Serial No. 723,809.

*To all whom it may concern:*

Be it known that I, FRANK GEIGER, a citizen of the United States, residing at Everest, in the county of Brown and State of Kansas, have invented certain new and useful Improvements in Egg-Trays for Incubators; and I do declare the following to be a full, clear, and exact description of the invention, such as will enable others skilled in the art to which it appertains to make and use the same.

This invention relates to improvements in egg turning means for incubators.

The object of the invention is to provide simple and efficient means for mechanically turning all of the eggs contained in an incubator drawer or tray without handling them.

Another object is to provide an egg tray having shiftable reciprocatory means for partially turning the eggs on each reciprocation thereof.

With these and other objects in view, the invention consists of certain novel features of construction, and the combination and arrangement of parts as will be more fully described and claimed.

In the accompanying drawings: Fig. 1 represents a top plan view of this improved tray in position ready for use. Fig. 2 is a similar view with the egg retaining rack removed and the tray ready for the hatch. Fig. 3 is an end elevation of the tray with the rack in position thereon. Fig. 4 is a longitudinal vertical section taken on the line 4—4 of Fig. 1. Fig. 5 is a transverse section taken on the line 5—5 of Fig. 4. Fig. 6 is a detail sectional view showing the removable side member and egg retaining rod displaced and arranged in juxtaposition ready for removing. Fig. 7 is a detail longitudinal section taken on the line 7—7 of Fig. 5.

In the embodiment illustrated, a rectangular tray 1 is shown provided with a reticulated bottom 2 terminating near one end thereof to leave an exit space 3 for the passage of the chicks to the brooder. This space 3 is closed during the incubating period by a removable plate 4, one edge of which fits in a slot 5 in the end of the member of the tray (see Fig. 4) and the other edge rests on the reticulated bottom. Slidably mounted on this tray 1 is an open rack 6, the length of which is several inches less than that of the tray to provide for its free movement back and forth on said tray. This rack consists of parallel side members 7 and 8 connected by end members 7' and 8'. The member 7 is provided with a wear plate 9 and said plate and side member have a plurality of longitudinally spaced registering sockets 10 and 11 therein for the reception of one end of the egg turning rods 12. The opposite side member 8 is composed of separable upper and lower sections 13 and 14, the lower section 14 being secured at its ends to the end members of the rack. This lower section has a wear plate 15 secured to its inner face and the upper edges of said plate and section 14 are provided with a plurality of registering notches 16 arranged in alinement with the sockets 10 and 11 in the other side members 7 and which are adapted to receive the other ends of the rods 12. The notches in the section 14 extend across a portion of its width only, whereby a stop in the form of a shoulder 17 is formed for limiting the longitudinal movement of the rods 12 and prevent them from becoming displaced.

The upper section 13 of the side member 8 fits over section 14 and the ends thereof slide under plates 18 which project laterally from the end members of the rack and said sections are limited in their inward movement by longitudinally extending stops 19 on the outer face of the ends of said section 14 (see Figs. 3 and 4).

A rod 20 is preferably mounted at the inner end of the space 3 of the tray 1 extending transversely of said tray adjacent the terminal of the reticulated bottom thereof and having its ends detachably mounted in the side bars of the tray. This rod 20 is designed to form a stop for preventing the egg shells during the hatch from passing through the opening or space 3 into the brooder below.

In the use of this egg turning tray, the plate 4 is placed in position to close the space 3 and the rack 6 is placed over said tray with the lower face of its side members resting on the upper face of the side members of the tray, said tray and rack being designed to slide in suitable guides 21 formed on opposite sides of the incubator 3 shown clearly in Fig. 5. The rods 12 are then placed at suitable distances apart in the rack with their opposite ends engaging the sockets and notches respectively of the side members of said rack, the distance between the rods being regulated by the size of the eggs. It is understood that before the rods are placed in position, the upper section 13 of the side member 8 of the rack is first removed. After these rods have been positioned the section 13 of the side member 8 is slipped into position under the lateral projections on the end members of the rack, and the tray is then ready for use. When it is desired to turn the eggs, the tray is withdrawn from the incubator a sufficient distance to permit the rack 6 to be moved longitudinally thereon, the reciprocation of said rack in one direction being sufficient to turn the eggs about one half over. When further turning of the eggs is desired, the rack is moved in the opposite direction and the eggs are again partially turned, the rods 12 serving as guides to assist in turning the eggs.

About eighteen hours more or less before the hatch is expected, the rack 6 is removed from the tray 1 and the plate 4 is also removed to open the exit passage 3. After the chicks hatch, they may pass out through the opening 3 into the brooder below, thereby avoiding danger of the hatching chicks being mashed.

While I have described my invention with more or less minuteness as regards details and as being embodied in certain precise forms, I do not desire to be limited thereto unduly any more than is pointed out in the claim. On the contrary, I contemplate all proper changes in form, construction and arrangement, the omission of immaterial elements and substitution of equivalents as circumstances may suggest or render expedient.

I claim as my invention:—

The combination with an incubator tray comprising a frame having a reticulated bottom, of an egg turning rack shorter than and slidable on said tray and comprising an open frame, one side member of which is provided with a plurality of laterally extending sockets on its inner face, a wear plate secured to the inner face of said side member and having apertures registering with said sockets, the other side member being constructed in longitudinally horizontally separable sections, one of said sections being fixed to the end members of said frame and provided with a plurality of notches extending transversely from the inner face of said section through a portion of the width thereof, said notches being arranged in alinement with the sockets in the other side member, rods removably mounted in said sockets and notches, the other section of said side member being arranged over said notches, lugs extending laterally inward from the end members of said frame over said sectional side member and end whereby said member is adapted to slide, and longitudinal stops on the outer face of said removable section at its opposite ends for limiting the inward movement of said section.

In testimony whereof I have hereunto set my hand in presence of two subscribing witnesses.

FRANK GEIGER.

Witnesses:
 LEWIS A. JENSEN,
 G. D. BOLLINGER.